April 25, 1933.  G. R. YENZER  1,905,669
VIBRATION TRANSLATING DEVICE

Filed Sept. 9, 1931

INVENTOR
G. R. YENZER
BY
*G. M. Campbell*
ATTORNEY

Patented Apr. 25, 1933

1,905,669

UNITED STATES PATENT OFFICE

GEORGE R. YENZER, OF WOODHAVEN, NEW YORK, ASSIGNOR TO BELL TELEPHONE LABORATORIES, INCORPORATED, OF NEW YORK, N. Y., A CORPORATION OF NEW YORK

VIBRATION TRANSLATING DEVICE

Application filed September 9, 1931. Serial No. 561,865.

This invention relates to electromagnetic vibration translating devices and more particularly to devices of this kind which are suitable for recording phonograph records.

In such recorders the vibration of the armature must be opposed by a force which increases with the armature displacement so as to prevent the armature from adhering to the pole faces and to restore it to its neutral position when the displacing force is removed. In structures of the prior art this force has been supplied in various ways such as by a diaphragm forming part of the moving system, or by spring members, one form of which is shown in Patent 1,663,885 to Holland, March 27, 1928.

It is also well understood that to insure a faithful record such recorders must be supplied with much more energy than is required for the actual cutting operation and that the moving system must be provided with suitable means for absorbing the excess energy. One common form of a damping device of this kind which is suitable for high quality work is a loaded mechanical line of the type shown in Patent 1,663,884 to Harrison, March 27, 1928.

It is the object of this invention to provide a very simple and compact recorder which is relatively inexpensive to build but which is capable of responding uniformly to a frequency range sufficient for most purposes.

In accordance with the general features of the invention, the recorder is of the balanced armature type having the stylus arm and the armature on opposite ends of a shaft which is vibratably mounted in its supporting member by rubber tubing which holds the shaft in the proper position with the necessary resiliency.

The required restoring force for the armature is provided by a pin member extending between the stationary and the moving structures of the device in such a position that the vibrations on the moving structures set up bending stresses in the pin which oppose the vibratory movement. In one embodiment of this feature of the invention a small steel pin extends through the armature shaft and is clamped at either end to the stationary structure of the device. In another form the pin extends between the stationary structure and the tip portion of the armature with sufficient free length to provide the required stiffness. A further feature of this latter form of biasing arrangement is an adjusting means for varying the stiffness of the pin and adjusting the armature to the exact neutral position between the pole pieces. In its preferred form this adjusting arrangement comprises a set screw in the frame having an eccentrically located hole which receives the end of the pin with a sliding fit. A slight rotary motion of the set screw changes the normal position of the armature and a complete turn of the screw varies the stiffness of the pin by changing its effective length.

The necessary damping for the moving system is obtained in a very compact manner by means of a small block of resilient material, such as rubber, attached to the stylus bar and in frictional contact with the stationary structure of the device.

These and other features of the invention will be more clearly understood from the following detail specification and the drawing in which.

Figure 1:
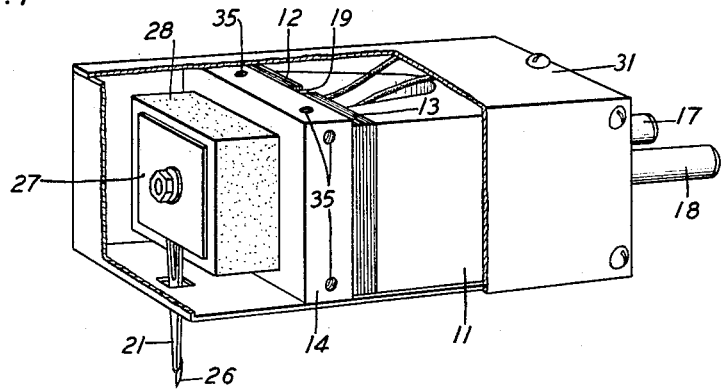
Fig. 1 is a perspective assembly view of a recorder according to this invention.
Figure 2:
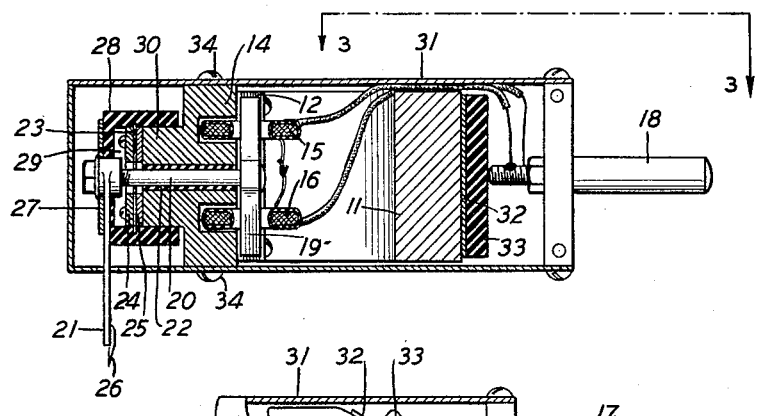
Fig. 2 is a sectional view of the recorder.

Referring now to Figs. 1 and 2, the magnet 11 has pole pieces 12 and 13 secured to the non-magnetic member 14 to form a magnet system of the general type of that disclosed in the Harrison patent referred to above. These pole pieces and the member 14 have recesses for the coils 15, 16 which receive the currents representing the sound to be recorded through the studs 17, 18 which serve as both a mechanical and an electrical connection for associating the recorder with a suitable supporting arm. Extending through the coils and cooperating with the pole pieces is a balanced armature 19 secured to the shaft 20 which carries a stylus bar 21 having a cutting stylus 26 and this armature is vibratably secured in the member 14 by a piece of rubber tubing 22.

The alternating signal currents in the coils set up a correspondingly varying flux in the armature which causes it to vibrate about its neutral position as in other devices of this general type. In this embodiment of the invention the necessary restoring force for the armature is provided by the pin 23 which extends through the shaft 20 and is clamped to the member 14 between slotted washers 24, 25. Integral with the stylus bar 21 is a rectangular plate 27 having cemented to it a block of resilient material 28 for damping the moving system. It has been found that reclaimed rubber is a particularly suitable material for this purpose due to its very high dissipative properties. The block 28 has a large circular hole 29 into which projects the circular portion 30 of the member 14 as shown. When the armature vibrates the excess energy is absorbed in the rubber due to the torsional stresses set up in it by its own inertia and by reason of the friction of the rubber engaging the washers 24 and 25 and the circular portion 30. It will also be readily seen that this construction makes possible a much shorter recorder structure than when the rubber damping is accomplished solely by reason of the inertia of the rubber as in the Harrison patent referred to above.

The amount of rubber required will depend, of course, upon the permissible variation in response in each case and also upon the stiffness of the biasing pin 23. Since these recorders are intended primarily for applications in which reasonably good results are desired with the minimum of expense, the impedance of these recorders will, in general, be less than those intended for the highest quality work. This permits the use of much less damping with a corresponding gain in efficiency and results in a recorder having a range of frequency response quite sufficient for most purposes.

Figure 3:
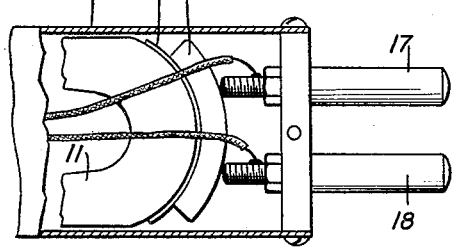
Fig. 3 is a detail view of a device for holding the magnet in its proper position.

To prevent any possibility of the magnet 11 becoming displaced due to jarring of the recorder, it has been found advantageous in assembling it in its casing 31 to insert a flat spring 32 (Fig. 3) between the magnet 11 and the insulating block 33 so that when the magnet system is secured in place by screws 34 engaging holes 35 in the member 14, the spring 32 will exert a pressure between the magnet and the pole pieces 12 and 13.

Figure 4:
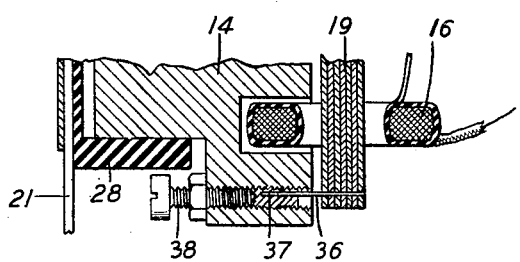
Fig. 4 shows a modified form of the armature biasing arrangement of Fig. 2.

In the alternate form of armature biasing arrangement shown in Fig. 4 the steel pin 36 fits tightly into the tip of the armature 19 and projects into an eccentric hole 37 in the set screw 38 with a sliding fit. It will be clear from the drawing that the stiffness of this biasing arrangement may be varied over a wide range to suit the requirements in a particular case by turning the screw 38 one or more complete turns either way from the position shown and that, due to the slight eccentricity of the hole 37 in the screw 38, a slight rotation of the screw will cause the armature to take up the proper central position between the pole pieces if the recorder should get out of adjustment in this respect.

It will be understood that while the invention has been described with reference to particular structures, various modifications may be made in this device within the scope of the following claims.

What is claimed is:

1. In an electromagnetic translating device, a stationary structure including a magnet, a moving system including an armature adapted to vibrate between the poles of the magnet, a pin biasing member secured at one end to the moving system, and means cooperating with the pin for adjusting the position of the armature with respect to the poles of the magnet comprising a set screw in the stationary structure having an eccentric hole for receiving the other end of the pin.

2. In an electromagnetic translating device, a stationary structure including a magnet, a moving system including an armature adapted to vibrate between the poles of the magnet, a pin member extending between said stationary structure and the moving system, and a set screw having an eccentric hole cooperating with the pin for adjusting the position of the armature with respect to the poles of the magnet and for varying the effective stiffness of the pin.

3. In an electromagnetic translating device, a stationary structure including a magnet, a moving system including an armature adapted to vibrate between the poles of the magnet, a set screw in the stationary structure having an eccentric hole in the end thereof, and a pin secured to the moving system and extending into the hole in the set screw to provide a biasing means for the system.

4. In an electromagnetic recorder the combination with a stylus carrying member, an armature and a magnetic system therefor for driving the member, of means supporting the member and the system and resilient material secured to the member and in frictional contact with the supporting means.

5. In an electromagnetic recorder the combination with a stylus carrying member, an armature and magnetic system therefor for driving the member, of means supporting the member and the system, spring biasing means for the armature and resilient material secured to the member and enclosing the biasing means.

6. In an electromagnetic recorder, a magnetic system including pole pieces, coils for receiving currents representing sounds to be recorded, a non-magnetic member supporting the coils and the pole pieces, an armature cooperating with the pole pieces and the coils, a shaft for the armature, a rubber bearing in the member for the shaft, a stylus carrying member secured to the shaft and resilient means cooperating with the shaft and the non-magnetic member for limiting the vibrations of the stylus carrying member.

In witness whereof, I hereunto subscribe my name this 3d day of September, 1931.

GEORGE R. YENZER.